Figure 1:
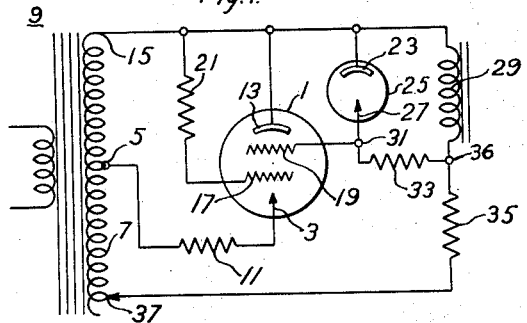

Oct. 16, 1934.  L. R. QUARLES  1,977,353

LIGHT RELAY

Filed March 24, 1931

WITNESSES
Arthur J. McMahon
Hymen Diamond

INVENTOR
Lawrence R. Quarles
BY Wesley L. Carr
ATTORNEY

Patented Oct. 16, 1934

1,977,353

UNITED STATES PATENT OFFICE 1,977,353

LIGHT RELAY

Lawrence R. Quarles, Wilkinsburg, Pa., assignor to Westinghouse Electric & Manufacturing Company, a corporation of Pennsylvania Application March 24, 1931, Serial No. 524,872

9 Claims. (Cl. 250—41.5)

My invention relates to relays and has particular relation to relays of a type incorporating electric-discharge devices.

A relay of the electric-discharge type ordinarily comprises an electric-discharge device having a control electrode and a plurality of principal electrodes. A trigger device is connected across the control electrode and one of the principal electrodes and, ordinarily, a variable impedance to which the electric-discharge device responds by becoming excited.

Under ordinary circumstances, a voltage is impressed between the principal electrodes of the electric-discharge device and, by reason of the fact that the trigger impedance is connected between the control electrode and a principal electrode of the device, a voltage is impressed between its terminals. The trigger impedance is customarily of such character that the voltage impressed across its terminals is not in phase with the electromotive force impressed across the principal electrodes.

A variation in the trigger impedance, therefore, results not only in a variation in the voltage impressed between its terminals but also in a shift in phase of this voltage relative to the voltage impressed between the principal electrodes. On the other hand, only the component of the voltage impressed across the trigger impedance that is in phase with the voltage impressed between the principal electrodes of the electric-discharge device is effective in producing the necessary electrostatic variation in the electric-discharge device that renders its activity responsive to the condition of the trigger impedance. It is apparent that, at times, the variation in phase and the variation in magnitude of the voltage impressed across the trigger impedance may be of such relative polarity and magnitude that the component thereof that is in phase with the voltage impressed between the principal electrodes of the electric-discharge device is varied in a direction in which the expected change in the condition of the tube is not produced. When this situation exists undesirable transition phenomena occur.

It is an object of my invention to provide a relay, of a type incorporating an electric-discharge device, wherein transition phenomena shall not be present.

A specific object of my invention is to provide a photo-sensitive relay wherein transition phenomena shall be absent from the characteristic of the response.

According to my invention, I provide a relay comprising a plural-electrode electric-discharge device having a trigger impedance connected across its control electrode and one of its principal electrodes, and incorporating a device whereby the phase of the voltage impressed across the trigger impedance is so adjusted that the variations in the impedance can produce only a phase shift of one polarity. The phase shift is of such character as to correspond to the variation in potential produced by the change in impedance. Although my invention is applicable to electric-discharge relays incorporating all types of the trigger impedance well known in the art, it has been specifically illustrated as applied to a photo-sensitive trigger.

Figure 2:
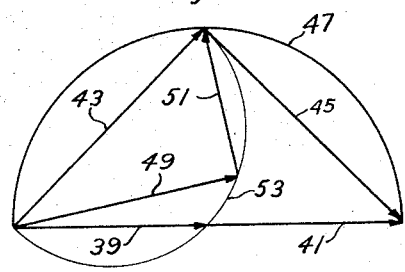
Figure 3:
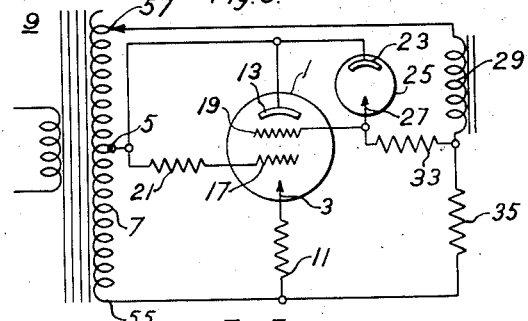
Figure 4:
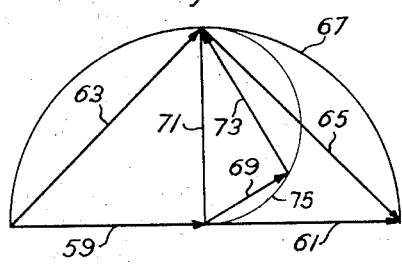
Figure 5:
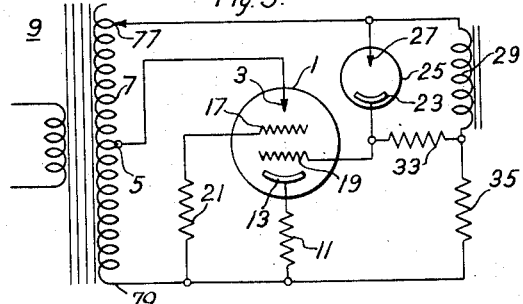
Figure 6:
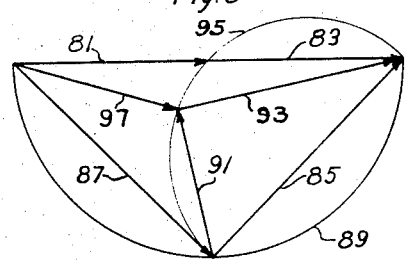
Figure 7:
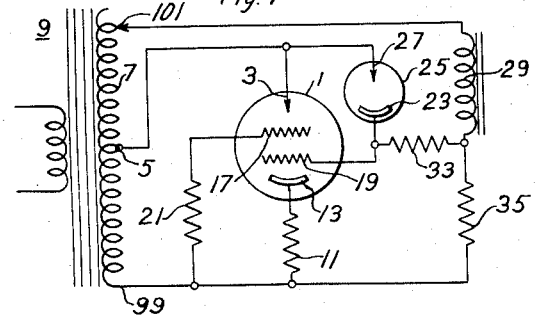
Figure 8:
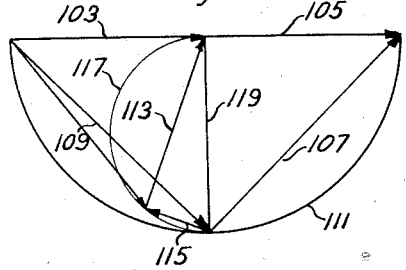

The novel features that I consider characteristic of my invention, are set forth with particularity in the appended claims. The invention itself, however, both as to its organization and its method of operation, together with additional objects and advantages thereof, will best be understood from the following description of specific embodiments, when read in connection with the accompanying drawing in which:

Figure 1 is a diagrammatic view showing the circuit of a relay constructed according to my invention, Fig. 2 is a vector diagram illustrating the operation of the relay shown in Fig. 1, Figs. 3, 5 and 7 are diagrams showing the circuits of modifications of my invention, and Figs. 4, 6 and 8 are vector diagrams relating, respectively, to the circuits illustrated in Figs. 3, 5 and 7.

The apparatus shown in Fig. 1 comprises an electric-discharge device 1, the anode 3 of which is connected to the mid-tap 5 of the secondary 7 of a transformer 9 whereby power is supplied to the system through a current-limiting impedance 11, and the cathode 13 of which is connected to one terminal 15 of the secondary 7. A shielding grid 17, disposed between the control electrode 19 and the anode 3 of the electric-discharge device 1, is connected to the cathode 13 of the electric-discharge device 1 through an impedance 21. Since the shielding grid 17 is not related to the present invention, any explanation with regard to its function and use is superfluous. It is to be noted that my invention is equally applicable to apparatus which does not incorporate a shielding grid.

The cathode 13 of the electric-discharge device 1 is connected to the cathode 23 of a photo-sensitive device 25, while the control electrode 19 of the electric-discharge device 1 is connected to the anode 27 of the photo-cell 25. An inductor 29 is connected between the cathodes 13 and 23 and the junction point 31 of the anode 27 of the photo-sensitive device and the control electrode 19 of the electric-discharge device 1 through a suitable impedance 33, and a resistor 35 is connected to the junction point 36 of the inductor 29 and the impedance 33 and to the other terminal 37 of the secondary 7 of the transformer 9. The position of the terminal 37 may be varied along the secondary 7 and, consequently, the voltage impressed across the photo-sensitive device 25 may be varied.

It is understood that a mechanical relay of any type suitable to the application may be incorporated in the principal circuit of the electric-discharge device.

In the apparatus of the type illustrated in Fig. 1, the electric-discharge device 1 is in an energized condition when the photo-sensitive device 25 is deenergized. When the photo-sensitive device 25 becomes excited, its impedance is reduced and, consequently, the voltage between the control electrode 19 and the cathode 13 of the electric-discharge device 1 is reduced. The electromotive force impressed between the electrodes 13 and 19 may be so reduced that the discharge through the tube 1 is interrupted.

However, unless provisions are made for taking care of the shift in phase introduced by reason of the change in character of the photo-cell 25, as it passes from its unexcited state to its excited state, the electric-discharge device 1 may not break down as expected, since the component of the voltage in phase with the voltage impressed across the principal electrodes 3 and 13 of the device 1 may not have the proper variation in magnitude. The provisions for avoiding this difficulty are present in my improved relay in the form of the inductor 29 and the resistor 35 which are connected in series with the terminals 37 and 15 of the secondary 7 of the transformer 9.

The operation of the device can best be understood from a consideration of the vector diagram shown in Fig. 2.

In the vector diagram, the voltage impressed between the principal electrodes 3 and 13 of the electric-discharge device 1 is represented by a horizontal vector 39, and the voltage impressed between the mid-tap 5 and the terminal 37 of the secondary 7 is represented by a second horizontal vector 41 added to the other vector. Since the total voltage impressed across the inductor 29 and the resistor 35 is equal, in magnitude, to the square root of the sum of the squares of the individual voltages across the resistor and the inductor, the vectors 43 and 45, representing these voltages, intersect on a semi-circle 47, of which the vector representing the total voltage impressed across the secondary 7 is the diameter.

The semi-circle 47 lies above the sum of the vectors 39 and 41 by reason of the fact that the voltage impressed across the inductor 29 leads the voltage impressed across the secondary 7. On the other hand, the resultant voltage impressed across the photo-cell 25, when it is dark, lags in phase relative to the voltage impressed across the inductor 29, and the vector 49, representing this voltage, intersects the vector 51 representing the voltage impressed across the impedance 33 connected in series with the anode 27 of the photo-cell 25, on a semi-circle 53 of which the vector 43 representing the voltage impressed across the inductor 29 is the diameter. It is to be noted that the inductor 29 and the resistor 35, connected in series with the secondary 7, are of such magnitude, relative to the magnitude of the capacity of the photo-cell 25, that the shift in phase of the voltage impressed across the photo-cell is such as to lead the voltage impressed across the principal electrodes 3 and 13 of the electric-discharge device 1.

The result of the excitation of the photo-cell is to decrease the magnitude of the voltage impressed between its terminals 23 and 27, and also to decrease the shift in the phase of the voltage impressed between its terminals relative to the voltage impressed across the inductor 29. That is to say, the vector 49, representing the voltage impressed across the photo-cell 25, is decreased in magnitude and is rotated in a counter-clockwise direction. Hence, the horizontal projection of the vector 49, representing the voltage impressed across the photo-cell, decreases both by reason of the phase shift and also by reason of the decrease in the magnitude of the impedance of the photo-cell. It is to be noted that, if the voltage impressed across the photo-cell were of such character that the vector 49, representing it, lay below the horizontal vector 39, the variation in phase would effect an increase in the magnitude of the projection of the vector, which, under certain circumstances, would compensate for the decrease produced by the decrease in the magnitude of the impedance of the photo-cell, and, as a result, the electric-discharge device would not respond, as expected.

It should be pointed out, in passing that, from a rigorous theoretical standpoint, the vector analysis given hereinabove is not strictly accurate. The discrepancy arises by reason of the fact that such apparatus as electric-discharge devices and photo-sensitive devices are ordinarily asymmetric conductors, and vector analysis does not rigorously apply to these.

However, when the photo-sensitive device in apparatus of the type, illustrated in Fig. 1, is dark, it is similar in its response to a capacitor, and the vector analysis, at least approximately, applies to it. Moreover, while the vector analysis does not, with any degree of accuracy, apply when the cell becomes excited, the variation in the quantities represented by the vectors introduced by reason of its excitation are in the directions indicated by the vector.

Whether the analysis is sufficiently accurate or not is only a matter of theory. The fact remains that I have experimentally produced a relay of the type described herein and have found it to respond as expected from the theory. The transition points are completely eliminated, and the relay reacts in a reliable manner.

It should be noted that the point at which the relay responds to illumination may be regulated by varying the lower terminal 37 of the secondary 7 of the transformer 9. By so varying the terminal, the voltage impressed between the control electrode 19 and the cathode 13 of the electric-discharge device 1 is varied, and the response of the device is varied.

In a relay that I have found particularly useful, the electro-motive force impressed between the upper terminal 15 and the mid-tap 5 of the secondary 7 of the power-supply transformer 9 is 440 volts. The electro-motive force impressed between the varying tap 37 and the mid-tap 5 varies from zero to 440 volts. The resistor 35 connected in series with the inductor 29 and with the secondary 7 of the transformer 9 is 20,000 ohms. The resistor 33 connected between the anode 27 of the photo-cell 25 and the inductor 29 is 80 megohms, and the inductor 29 has an inductance of 60 henries. In this system, the electric-discharge device is a gas-filled cold-electrode device commonly known as a grid-glow tube, and the photo-cell may be of any well known type. The current transmitted between the cathode and the anode of the cold-electrode device is of the order of a few milli-amperes, and the current-limiting resistor is of the order of several thousand ohms.

In the apparatus of the type illustrated in Fig. 3, the cathode 13 of the electric-discharge device 1 and the cathode 23 of the photo-sensitive device 25 are connected to the mid-tap 5 of the secondary 7 of the power-supply transformer 9. The anode 3 of the electric-discharge device is connected to a fixed terminal 55 of the secondary 7 through a current-limiting impedance 11, while the anode 27 of the photo-sensitive device 25 is connected to a variable terminal 57 of the secondary 7 through the impedance 33 and the inductor 29 which are similar to the corresponding elements of the apparatus illustrated in Fig. 1.

In Fig. 4, the voltages impressed across the secondary 7 of the transformer 9 are represented by the horizontal vectors 59 and 61; the voltages impressed across the resistor 35 and the inductor 29 are represented by the vectors 63 and 65 that intersect on a semi-circle 67 of which the sum of the horizontal vectors 59 and 61 is a diameter; and the vector 69, representing the voltage impressed across the photo-cell 25, is shown as lagging in phase behind the vector 71, representing the sum of the voltage impressed across the inductor 29 and the voltage impressed between the upper terminals 5 and 57 of the secondary 7 of the power-supply transformer 9.

The vectors 69 and 73, representing the voltage impressed across the photo-cell 25, and the voltage impressed across its associated impedance 33 intersect on a semi-circle 75 of which the vector 69, representing the resultant of the two voltage vectors 63 and 59 is the diameter. It will be noted that, in this case, also, an increase in the state of excitation of the photo-cell 25 results in a decrease in the length of the horizontal projection of the vector 69.

In Fig. 5, a relay of the type wherein the electric-discharge device is deenergized when the photo-cell is deenergized and becomes energized when the photo-cell becomes energized, is illustrated.

In apparatus of this type, the anode 27 of the photo-sensitive device 25 is connected to the adjustable terminal 77 of the secondary 7 of the power-supply transformer 9. The mid-tap 5 of the transformer 9 is connected to the anode 3 of the electric-discharge device 1, and the other terminal 79 of the transformer is connected to the cathode 13 of the electric-discharge device. The control electrode 19 of the electric-discharge device 1 is connected to the cathode 23 of the photo-sensitive device 25, and a plurality of resistors 11, 21, 33 and 35 and an inductor 29 are associated with the photo-sensitive device 25 and the electric-discharge device 1 in a manner similar to that in which the same elements are associated with the photo-sensitive device and electric-discharge device of the apparatus illustrated in the other views.

As in the above described vector diagrams, the voltages impressed across the secondary 7 of the power-supply transformers are represented as horizontal vectors 81 and 83. The voltages impressed across the inductor 29 and the resistor 35 in series with the secondary 7 are represented by vectors 85 and 87 intersecting on a semi-circle 89 of which the vectors 81 and 83 representing the total voltage impressed across the secondary is the diameter and which now, in accordance with the conventional practice, lies below this vector. The vectors 91 and 93, representing voltage impressed across the photo-sensitive device 25, and the voltage impressed across the impedance 33, associated therewith, lie on a semi-circle 95 of which the vector 85, representing the voltage impressed across the inductor 29, is the diameter. The voltage impressed between the grid 19 and the cathode 13 of the electric-discharge device is represented by a vector 97 drawn between the point of intersection of the vectors 91 and 93, representing the voltages impressed across the photo-sensitive device 25 and its associated resistor, and the point representing the voltage of the lower terminal 79 of the secondary 7 of the transformer 9.

It is seen that, as the photo-cell 25 becomes excited, the magnitude of the vector 93, representing the voltage impressed between its terminals 23 and 27, decreases in magnitude and is rotated in a counter-clockwise direction. In consequence thereof, the in-phase component of the voltage impressed between the control electrode 19 and the cathode 13 increases, and the electric-discharge device 1 becomes energized. It will be noted that, in this case, also, the variations in the magnitude and the phase of the voltage impressed across the electric-discharge device are of such polarity as to produce the same effective results.

The apparatus of the type illustrated in Fig. 7 is similar to apparatus of the type illustrated in Fig. 5, and relates thereto substantially as the apparatus illustrated in Fig. 3 relates to the apparatus illustrated in Fig. 1.

The anodes 27 and 3 of the photo-sensitive device 25 and of the electric-discharge device 1 are connected to the mid-tap 5 of the secondary 7 of the power-supply transformer 9. The cathode 23 of the photo-sensitive device 25 is connected to the control electrode 19 of the electric-discharge device 1, and the cathode 13 of the electric-discharge device is connected to the one terminal 99 of the secondary 7 through the current-limiting impedance 11. The junction point of the cathode 23 of the photo-sensitive device 25 and the control electrode 19 is connected to the other terminal 101 of the secondary 7 through the impedance 33 and the inductor 29. The resistors 21 and 35 are connected in the circuit in a manner similar to the corresponding elements of the apparatus illustrated in the other views.

The vector diagram illustrated in Fig. 8 is, in many respects, similar to the vector diagrams illustrated in Fig. 6 and in Fig. 4. The voltages across the secondary 7 are represented by horizontal vectors 103 and 105, and the voltages across the inductor 29 and the resistor 35 are represented by vectors 107 and 109 that intersect on a semi-circle 111 of which the sum of the horizontal vectors 103 and 105 is a diameter. The voltage impressed across the photo-sensitive device 25 is represented by a vector 113 which intersects the vector 115 representing the voltage impressed across the resistor 33, associated with the photo-sensitive device 25 on a semi-circle 117 of which the vectorial sum 119 of the voltages impressed across the inductor and across its associated half of the secondary 7 is the diameter.

The results produced by illuminating the photocell 25 incorporated in apparatus are similar to the results produced in the apparatus illustrated hereinabove and need not be described in detail.

The invention, as described hereinabove, has been shown as incorporated in a system comprising a photo-sensitive trigger device 25 and an electric-discharge device 1 of a particular type. It is a well known fact that my invention may be applied with facility to apparatus incorporating triggers other than photo-sensitive triggers and grid-controlled electric-discharge devices of other types than the one illustrated. In particular, my invention may be applied to the operation of relays incorporating vacuum tubes and mercury discharge tubes of the grid-controlled type and types of ionic type such as electrodes responsive to flames, devices responsive to high-frequency discharge, and discharge devices responsive to radio activity.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. A control system comprising an electric discharge device having a control electrode and a plurality of principal electrodes, a photo-sensitive device, having the property of a combined variable capacitor and variable resistor as its excitation is varied, coupled between said control electrode and one of said principal electrodes for varying the power output of said electric discharge device, power-supply means including a transformer winding having an intermediate tap and a plurality of terminal taps, means for connecting said intermediate tap and one of said terminal taps to said principal electrodes, a network including a resistor and an inductor connected in series, means for connecting the terminals of said network to the terminal taps of said transformer winding and means for connecting the junction point of said inductor and said resistor to said control electrode, thereby to set up a phase-relationship between the potentials impressed between the electrodes of said electric discharge device that is of such character that transition phenomena, arising in the operation of said electric discharge device as its power output is varied by variations in the excitation of said photo-sensitive device, are suppressed.

2. A control system comprising an electric discharge device having an anode, a cathode and a control electrode, a photo-sensitive device, having the property of a combined variable capacitor and variable resistor as its excitation is varied, coupled between said control electrode and said cathode, power supply means including a transformer winding having terminal taps and an intermediate tap, means for connecting said cathode and anode between said intermediate tap and one of said terminal taps, a network including a resistor and an inductor connected in series, means for connecting the terminals of said network to the terminal taps of said transformer winding and means for connecting the junction point of said resistor and inductor of said network to said control electrode, thereby to set up a phase relationship between the potentials impressed between said anode and cathode and the potentials impressed between said control electrode and said anode and cathode that is of such character that transition phenomena, arising in the operation of said electric discharge device as its power output is varied by variations in the excitation of said photo-sensitive device, are suppressed.

3. A control system comprising an electric discharge device having an anode, a cathode and a control electrode, a photo-sensitive device having the property of a combined variable capacitor and variable resistor as its excitation is varied, coupled between said control electrode and said anode, power supply means including a transformer winding having terminal taps and an intermediate tap, means for connecting said cathode and anode between said intermediate tap and one of said terminal taps, a network including a resistor and an inductor connected in series, means for connecting the terminals of said network to the terminal taps of said transformer winding and means for connecting the junction point of said resistor and inductor of said network to said control electrode, thereby to set up a phase relationship between the potentials impressed between said anode and cathode and the potentials impressed between said control electrode and said anode and cathode that is of such character that transition phenomena, arising in the operation of said electric discharge device as its power output is varied by variations in the excitation of said photo-sensitive device, are suppressed.

4. A control system comprising an electric discharge device having a control electrode and a plurality of principal electrodes, a photo-sensitive device, having the property of a combined variable capacitor and variable resistor as its excitation is varied, coupled between said control electrode and one of said principal electrodes for varying the power output of said electric discharge device, alternating power-supply means for impressing a periodic potential difference between said principal electrodes and a lesser potential difference between said control electrode and one of said principal electrodes, a network including a resistor and an inductor connected in series, means for connecting the terminals of said network to said principal electrodes, and means for connecting the junction point of said inductor and said resistor to said control electrode, thereby to set up a phase-relationship between the potentials impressed between the electrodes of said electric discharge device that is of such character that transition phenomena, arising in the operation of said electric discharge device as its power output is varied by variations in the excitation of said photo-sensitive device, are suppressed.

5. In combination, an electric discharge device having an anode, a cathode and a control electrode, an alternating power supply source connected between said anode and said cathode, a network including a resistor and an inductor connected in series, means for connecting the anode of said electric discharge device to said inductor and the cathode of said electric discharge device to said resistor, means for connecting the junction point of said inductor and resistor to said control electrode and means having the property of a combined capacitor and resistor coupled between said control electrode and said anode for controlling the excitation of said electric discharge device.

6. In combination, an electric discharge device having a plurality of principal electrodes and a control electrode, said device being of the type having an energized condition and a deenergized condition and being capable only of abrupt transition from one condition to the other, an alternating power supply source, means for coupling the terminals of said source to said principal electrodes, a network including an inductor and a resistor connected in series and having a plurality of terminal taps and an intermediate tap, means for coupling the terminal taps of said network to said principal electrodes, means for coupling said intermediate tap to said control electrode and means having the property of a combined capacitor and resistor for controlling the excitation of said electric discharge device coupled between the control electrode and the principal electrode to which said inductor of said network is coupled.

7. In combination, an electric discharge device having a plurality of principal electrodes and a control electrode, said device being of the type having an energized condition and a deenergized condition and being capable only of abrupt transition from one condition to the other, an alternating power supply source, means for coupling the terminals of said source to said principal electrodes, a network including an inductor and a resistor connected in series and having a plurality of terminal taps and an intermediate tap, means for coupling the terminal taps of said network to said principal electrodes, means including a resistor for coupling said intermediate tap to said control electrode and means, having the property of a combined capacitor and resistor, for controlling the excitation of said electric discharge device coupled between the control electrode and the principal electrode to which said inductor of said network is coupled.

8. In combination, an electric discharge device having a plurality of principal electrodes and a control electrode, said device being of the type having an energized condition and a deenergized condition and being capable only of abrupt transition from one condition to the other, an alternating power supply source, means for coupling the terminals of said source to said principal electrodes, a network including an inductor and a resistor connected in series and having a plurality of terminal taps and an intermediate tap, means for coupling the terminal taps of said network to said principal electrodes, means including a resistor for coupling said intermediate tap to said control electrode and a photo-sensitive device having the property of a combined capacitor and resistor for controlling the excitation of said electric discharge device coupled between the control electrode and the principal electrode to which said inductor of said network is coupled.

9. In combination, an electric discharge device having an anode, a cathode and a control electrode, immersed in a gaseous medium, an alternating power supply source, means for connecting the terminals of said source to said anode and cathode, a network including an inductor and a resistor connected in series, means for connecting the terminals of said network to said anode and cathode, means, including another resistor, for connecting the junction point of said inductor and said first-named resistor to said control electrode and a photo-sensitive device having the property of a combined resistor and capacitor connected between said anode and said control electrode of said electric discharge device to control the excitation thereof.

LAWRENCE R. QUARLES.